(12) United States Patent
Fukunaga et al.

(10) Patent No.: US 6,410,640 B1
(45) Date of Patent: Jun. 25, 2002

(54) ONE-PACK TYPE CURABLE RESIN COMPOSITION

(75) Inventors: Atsushi Fukunaga; Yoshiteru Masaoka; Hiroshi Ando; Fumio Kawakubo, all of Hyogo (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/536,990

(22) Filed: Mar. 29, 2000

(30) Foreign Application Priority Data

Mar. 29, 1999 (JP) .......................................... 11-086689

(51) Int. Cl.$^7$ ..................... C08L 83/04; C08L 83/06; C08G 77/08
(52) U.S. Cl. ..................... 524/588; 524/858; 524/860; 524/863; 525/403; 525/476; 528/17; 528/33; 528/34; 528/38; 528/901
(58) Field of Search ................................. 524/588, 858, 524/860, 863; 525/403, 476; 528/17, 33, 34, 38, 901

(56) References Cited

U.S. PATENT DOCUMENTS

| 4,507,469 A | | 3/1985 | Mita et al. | |
|---|---|---|---|---|
| 4,657,986 A | * | 4/1987 | Isayama et al. | 525/407 |
| 5,051,463 A | * | 9/1991 | Yukimoto et al. | 524/306 |
| 5,650,467 A | * | 7/1997 | Suzuki et al. | 525/100 |
| 6,025,445 A | * | 2/2000 | Chiba et al. | 525/326.5 |

FOREIGN PATENT DOCUMENTS

| EP | 0 252 372 | 1/1988 |
|---|---|---|
| EP | 0 473 793 | 3/1992 |
| EP | 1 090 960 | 4/2001 |
| JP | 57-182-350 | 2/1983 |
| JP | 62-35421 | 8/1987 |
| WO | WO 00/58392 | 10/2000 |

OTHER PUBLICATIONS

English abstract of JP 06116547 assigned to Sunstar Giken KK, Apr. 1994.*

* cited by examiner

Primary Examiner—Robert Dawson
Assistant Examiner—Jeffrey B. Robertson
(74) Attorney, Agent, or Firm—Armstrong, Westerman & Hattori, LLP

(57) ABSTRACT

A one-pack type curable resin composition having high adhesive strength to various substrates, good storage stability and excellent restoring properties is disclosed. The one-pack type curable resin composition contains an organic polymer (a) having at least one reactive silicon group per molecule, a compound (b) having reactive silicon group in its molecule, a non-phthalate plasticizer (c) having no phthalate structure in its molecule, and a stannous curing catalyst (d).

6 Claims, No Drawings

ONE-PACK TYPE CURABLE RESIN COMPOSITION

FIELD OF THE INVENTION

This invention relates to a one-pack type curable resin composition containing a polymer having reactive silicon group. More particularly, it relates to a one-pack type curable resin composition which remains stable over a long period of time in a sealed state but cures upon exposure to moisture to give a rubbery substance.

BACKGROUND OF THE INVENTION

Generally known curing resin compositions are classified into one-pack type curable resin compositions which remain stable in a sealed state but cure when exposed to moisture and two-pack ones which cure by mixing the main agent with a curing agent at a definite ratio before using. The one-pack type curable resin compositions possess a large advantage over the two-pack ones that no complicated mixing operation is needed.

As these one-pack type curable resin compositions, there have been already known curable resin compositions containing organic polymers having silicon-containing groups (hereinafter also referred to as reactive silicon groups) which have hydroxyl group and/or hydrolyzable group bonded to a silicon atom and can be crosslinked by forming a siloxane bond in the presence of moisture.

As examples of these organic polymers having reactive silicon groups to be used in the one-pack type curable resin compositions, JP-A-52-73998 and JP-5-125272 disclose polyoxyalkylene polymers having reactive silicon group which have been already produced industrially and employed in various curable resin compositions (the term "JP-A" as used herein means an "unexamined published Japanese patent application").

When exposed to moisture in the atmosphere, curable resin compositions containing organic polymers having reactive silicon group cure to give rubbery substances. By taking advantage of this characteristic, these compositions are usable in, for example, constructional sealants, adhesives and coating materials.

The curable resin compositions to be used in sealants, adhesives and coatings and the rubbery cured substances obtained by curing these compositions should have various characteristics. In particular, adhesiveness to substrates and restoring properties are important factors, in addition to mechanical characteristics such as modulus, breaking elongation and breaking strength. Thus, a number of studies have been made hitherto on curable resin compositions containing organic polymers having reactive silicon group.

As the results of these studies, it has been already clarified that mechanical properties (for example, modulus, breaking elongation and breaking strength) adequate for various uses can be obtained by adding plasticizers such as phthalates to curable resin compositions.

As JP-B-62-35421 proposes, it has been also known that a high adhesive strength to various substrates can be achieved by adding silane coupling agents (for example, aminosilane) to these compositions (the term "JP-B" as used herein means an "examined Japanese patent publication").

Moreover, JP-B-61-60867 (corresponding to U.S. Pat. No. 4,507,469 and European Patent 0877541) indicates that curable resin compositions having remarkably improved restoring properties can be presented by using stannous organic carboxylates as a curing catalyst.

Based on these ordinary techniques, the present inventors have made studies on a one-pack type curable resin composition containing a compound having reactive silicon group in its molecule (for example, aminosilane) as an adhesiveness imparting agent, a stannous catalyst as a curing catalyst and a plasticizer (for example, a phthalate) to give a one-pack type curable resin composition satisfying all of the needs for mechanical characteristics, adhesiveness to substrates and restoring properties. As a result, they have found out that the thus obtained composition suffers from a serious problem that the catalytic activity is considerably deteriorated and thus the curing speed is largely lowered after storing.

Accordingly, an object of the invention is to provide a one-pack type curable resin composition which satisfies all of the needs for mechanical characteristics, adhesiveness to substrates and restoring properties and suffers from no deterioration in the catalytic activity during storage.

SUMMARY OF THE INVENTION

The present inventors have conducted intensive studies to solve the problems as described above. As a result, they have found out that a decrease in the activity and/or inactivation of a curing catalyst are caused not by the adsorption of the catalyst species by an inorganic filler or the denaturation thereof, as having been assumed in general, but by a completely different phenomenon, thereby solving the problem. That is to say, they have surprisingly found out a novel fact that in a case where a stannous curing catalyst exists together with a phthalate plasticizer or a hydrolyzable silyl group-containing compound, no decrease in the activity is observed regardless of the presence of an inorganic filler, while the activity of a stannous curing catalyst is deteriorated in a case where the stannous curing catalyst exists together with a phthalate plasticizer and a hydrolyzable silyl group-containing compound due to a reaction in which these three reactants participate. Based on this finding, the present inventors have successfully found out that a one-pack type curable resin composition having a high storage stability (i.e., suffering from no decrease in the catalytic activity during storage) can be obtained by using a non-phthalate plasticizer having no phthalate structure in its molecule as a plasticizer to be used in controlling the viscosity and mechanical characteristics of the one-pack type curable resin composition in the presence of a stannous curing catalyst employed as curing catalyst and a hydrolyzable silyl group-containing compound for imparting, for example, adhesiveness to the composition. The invention has been thus achieved.

Accordingly, the invention relates to a one-pack type curable resin composition which contains an organic polymer (a) having at least one reactive silicon group per molecule, a compound (b) having reactive silicon group in its molecule, a non-phthalate plasticizer (c) having no phthalate structure in its molecule, and a stannous curing catalyst (d).

In a preferred embodiment of the invention, it relates to the one-pack type curable resin composition as described above wherein the reactive silicon group in the organic polymer (a) having at least one reactive silicon group per molecule is an alkoxysilyl group.

In a still preferred embodiment of the invention, it relates to the one-pack type curable resin composition as described above wherein the compound (b) having reactive silicon group in its molecule is an amino group-containing silane compound (e).

In a still preferred embodiment of the invention, it relates to the one-pack type curable resin composition as claimed in claim 1, wherein the non-phthalate plasticizer (c) is at least one selected from the group consisting of an aliphatic dibasic acid ester, a glycol ester, a aliphatic ester, a phosphate, epoxidized plasticizer, an ester plasticizer, a polyether plasticizer, a polystyrene, a hydrocarbon plasticizer, and a chlorinated paraffin.

In a still preferred embodiment of the invention, it relates to the one-pack type curable resin composition as described above wherein the non-phthalate plasticizer (c) is a polyether plasticizer and/or a hydrocarbon plasticizer.

In a still preferred embodiment of the invention, it relates to the one-pack type curable resin composition as described above wherein the stannous curing catalyst (d) is at least one member selected from the group consisting of stannous octylate, stannous stearate, stannous naphthenate and stannous versatate.

DETAILED DESCRIPTION OF THE INVENTION

The organic polymer (a) having at least one reactive silicon group per molecule to be used in the invention is not restricted in the main chain skeleton. Namely, use can be made therefor of those having various main chain skeletons.

Particular examples of the organic polymer (a) include polyoxyalkylene polymers such as polyoxyethylene, polyoxypropylene, polyoxybutylene, polyoxytetramethylene, polyoxyethylene/ polyooxypropylene copolymer, and polyoxypropylene/ polyoxybutylene copolymer; hydrocarbon polymers such as ethylene/propylene copolymer, polyisobutylene, isobutylene/isoprene copolymer, polychloroprene, polyisoprene, isoprene (or butadiene)/acrylonitrile (and/or)/ styrene copolymer, polybutadiene, isoprene or butadiene/ acrylonitrile and/or styrene copolymer, and hydrogenated polyolefin polymers obtained by hydrogenating these polyolefin polymers; polyester polymers obtained by the condensation of dibasic acids (adipic acid, etc.) with glycol or by the ring-opening polymerization of lactones; acrylate polymers such as polyacrylates obtained by the radical polymerization of monomers (ethyl acrylate, butyl acrylate, etc.) and copolymers of acrylates (ethyl acrylate, butyl acrylate, etc.) with vinyl acetate, acrylonitrile, methyl methacrylate or styrene; graft polymers obtained by the polymerization of the vinyl monomer in the organic polymers as described above; polysulfide polymers; polyamide polymers such as nylon 6 obtained by the ring-opening polymerization of ε-caprolactam, nylon 6,6 obtained by the polycondensation of hexamethylenediamine with adipic acid, nylon 6,10 obtained by the polycondensation of hexamethylenediamine with sebacic acid, nylon 11 obtained by the polycondensation of ε-aminoundecanoic acid, nylon 12 obtained by the ring-opening polymerization of ε-aminolaurolactam, and nylon copolymers having two or more components selected from the nylons as cited above; polycarbonate polymers obtained by, for example, the polycondensation of bisphenol A with carbonyl chloride; and diallylphthalate polymers. Among the polymers having the main chain structures as described above, it is preferable to use polyester polymers, acrylate polymers, acrylate copolymers, polyoxyalkylene polymers, hydrocarbon polymers and polycarbonate polymers. Moreover, it is particularly preferable to use polyoxyalkylene polymers essentially having repeating units represented by the following general formula (1):

$$—R^1—O—\qquad(1)$$

wherein $R^1$ represents a divalent organic group which is preferably a linear or branched alkylene group having 1 to 14 carbon atoms;

since these polymers have relatively low glass transition temperatures and give cured products having good cold resistance.

Preferable examples of the $R^1$ in the general formula (1) include linear or branched alkylene groups having 1 to 14, still preferably 2 to 4, carbon atoms. Particular examples of the repeating units represented by the general formula (1) are as follows:

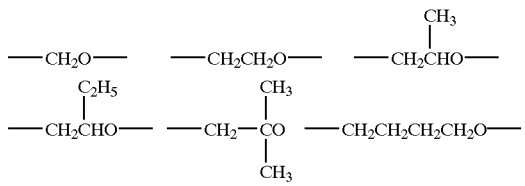

The main chain skeleton of the polyoxyalkylene polymer may consist of either one or two or more repeating units. In case of a curable resin composition to be used as, for example, a sealant, it is preferable to employ a polymer having oxypropylene as the main component.

The polyoxyalkylene polymer can be synthesized by, for example, the polymerization method with the use of an alkali catalyst such as KOH, the polymerization method with the use of a organoaluminum-porphyrin catalyst such as a complex obtained by reacting an organoaluminum compound with porphyrin as disclosed in JP-A-61-215623, the polymerization method with the use of a double metal cyanide complex catalyst as disclosed in, for example, JP-B-46-27250 and JP-B-59-15336, though the invention is not restricted thereto.

The main chain skeleton of the oxyalkylene polymer may contain other components such as urethane binding components so long as the characteristics of the oxyalkylene polymer are not seriously damaged thereby.

The urethane binding components as described above are not particularly restricted but include, for example, those obtained by reacting aromatic polyisocyanates such as toluene (tolylene) diisocyanate, diphenylmethane diisocyanate and xylylene diisocyanate; or aliphatic polyisocyanates such as isophorone diisocyanate and hexamethylene diisocyanate with polyols having the repeating units of the general formula (1).

The reactive silicon group contained in the polymer (a) is a group which has a hydroxyl group or a hydrolyzable group bonded to a silicon atom and can be crosslinked via the formation of a siloxane bond. Typical examples thereof include groups represented by the following general formula (2):

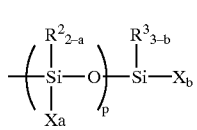

(2)

wherein $R^2$ and $R^3$ represent each an alkyl group having 1 to 20 carbon atoms, an aryl group having 6 to 20 carbon atoms, an aralkyl group having 7 to 20 carbon atoms or a triorganosiloxy group $R^4{}_3SiO—$ (wherein $R^4$ represents a monovalent hydrocarbon group having 1 to 20 carbon atoms and three $R^4$'s may be either the same or different from each other), provided that two or more $R^2$'s or $R^3$'s, if present, may be either the same or different from each other; X represents a hydroxyl group or a hydrolyzable group, provided that two or more X's, if present, may be either the same or different from each other; a is 0, 1 or 2 and b is 0, 1, 2 or 3, provided that in p repeating units of the following general formula (3):

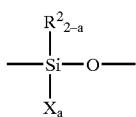

(3)

wherein a's may be either the same or different; and p represents an integer of from 0 to 19, provided that (the sum of a's)+b is not less than 1. The hydrolyzable group represented by X may be a ordinary hydrolyzable group without particular restriction. Examples thereof include hydrogen atom, halogen atoms, alkoxy groups, acyloxy groups, ketoxymate group, amino group, amido group, acid amido groups, aminoxy group, mercapto group and alkenyloxy groups. Among these groups, hydrogen atom, alkoxy groups, acyloxy groups, ketoxymate group, amino group, amido group, aminoxy group, mercapto group and alkenyloxy groups are preferable.

As the reactive silicon group, it is still preferable to use an alkoxysilyl group because of its mild hydrolyzability and convenience in handling.

One to three hydroxyl groups or hydrolyzable groups can be bonded to a silicon atom. The value "(the sum of a's)+b" preferably ranges from 1 to 5. When the reactive silicon group carries two or more hydroxyl groups or hydrolyzable groups, these groups may be either the same or different from each other.

The reactive silicon group has either one or more constituting silicon atoms. In case of silicon atoms bonded via, for example, siloxane bonds, the reactive silicon group may carry about 20 silicon atoms.

Reactive silicon groups represented by the following general formula (4):

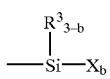

(4)

wherein $R^3$, X and b are each as defined above; are preferable from the viewpoint of availability.

Particular examples of $R^2$ and $R^3$ in the general formulae (3) and (4) include alkyl groups such as methyl group and ethyl group, cycloalkyl groups such as cyclohexyl group, aryl groups such as phenyl group, aralkyl groups such as benzyl group, and triorganosiloxy groups represented by $R^4{}_3SiO$— (wherein $R^4$ represents, for example, a methyl group or a phenyl group). Among these groups in $R^2$ and $R^3$, a methyl group is preferable. Particularly preferable examples of the structure of the reactive silicon group include trimethoxysilyl group, methyldimethoxysilyl group, triethoxysilyl group and methyldiethoxysilyl group. Either reactive silicon group of a single type or a mixture of reactive silicon groups of two or more types may be employed.

The reactive silicon group may be introduced by ordinary methods. For example, the following methods are usable therefor.

(A) An organic polymer having a functional group (for example, hydroxyl group) in its molecule is reacted with an organic compound having an active group reactive with the functional group and an unsaturated group to give an organic polymer having the unsaturated group. Alternatively, an organic polymer having an unsaturated group is obtained by the copolymerization with an unsaturated group-containing epoxy compound. Next, the reaction product thus obtained is treated with a hydrosilane having reactive silicon group to give a hydrosilyl.

(B) An organic polymer having an unsaturated group obtained as in (A) is reacted with a compound having mercapto group and reactive silicon group.

(C) An organic polymer having a functional group (for example, hydroxyl group, epoxy group, or isocyanate group) in its molecule is reacted with a compound having a functional group reactive with the former functional group and reactive silicon group.

Among these methods, it is preferable to use the method (A) or the method (C) wherein a polymer having terminal hydroxyl group is reacted with a compound having isocyanate group and reactive silicon group.

The polymer used as the component (a), which may be either a linear or branched one, has a molecular weight of from about 500 to 50,000, still preferably from 1,000 to 30,000. This polymer contains at least one, preferably 1.1 to 5, reactive silicon groups per molecule. When the polymer has less than 1 reactive silicon group per molecule, only insufficient curability is achieved. When it has an excessively large number of reactive silicon groups, on the other hand, the network structure thereof becomes too dense and thus no favorable mechanical characteristics are achieved.

Particular examples of the component (a) include those disclosed in JP-B-45-36319, JP-B-46-12154, JP-A-50-156599, JP-A-54-6096, JP-A-55-13767, JP-A-55-13468, JP-A-57-164123, JP-B-3-2450, U.S. Pat. Nos. 3,632,557, 4,345,053, 4,366,307 and 4,960,844, and oxyalkylene polymers having high molecular weight and narrow molecular weight distribution (i.e., having a number-average molecular weight of 6,000 or more and an Mw/Mn ratio of 1.6 or less) disclosed in JP-A-61-197631, JP-A-61-215622, JP-A-61-215623 and JP-A-61-218632, though the invention is not restricted thereto.

Either one of these organic polymers having reactive silicon group or a mixture of two or more of the same may be used. It is also possible to use an organic polymer prepared by blending vinyl polymers having reactive silicon group.

Processes for producing an organic polymer by blending vinyl polymers having reactive silicon group are disclosed, for example, in JP-A-59-122541, JP-A-63-112642 and JP-A-6-172631. A preferable example thereof is one wherein a copolymer composed of an acrylate monomer unit or a methacrylate monomer unit having an alkyl group having 1 to 8 carbon atoms which carries reactive silicon group and has a molecular chain substantially represented by the following general formula (5):

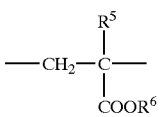

(5)

wherein $R^5$ represents a hydrogen atom or a methyl group; and $R^6$ represents an alkyl group having 1 to 8 carbon atoms; and an acrylate monomer unit and/or an alkyl methacrylate monomer unit having an alkyl group having 10 or more carbon atoms represented by the following general formula (6):

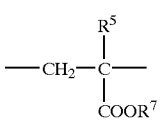

(6)

wherein $R^5$ is as defined above; and $R^7$ represents an alkyl group having 10 or more carbon atoms;

is blended with an organic polymer having reactive silicon group.

Examples of the $R^6$ in the general formula (5) include alkyl groups having 1 to 8, preferably 1 to 4 and still preferably 1 or 2, carbon atoms such as methyl group, ethyl group, propyl group, n-butyl group, t-butyl group and 2-ethylhexyl group. The alkyl group of $R^6$ may be either a single group or a mixture of two or more groups.

Examples of $R^7$ in the general formula (6) include long-chain alkyl groups having 10 or more, usually 10 to 30 and preferably 10 to 20, carbon atoms such as lauryl group, tridecyl group, cetyl group, stearyl group, and behenyl group. The alkyl group of $R^7$ may be either a single group or a mixture of two or more groups, similar to $R^6$.

The molecular chain of the vinyl copolymer substantially consists of the monomer units of the formulae (5) and (6). The term "substantially" as used herein means that the sum of the contents of the monomer units of the formulae (5) and (6) exceeds 50% by weight of the copolymer. It is preferable that the sum of the contents of the monomer units of the formulae (5) and (6) is 70% by weight or more.

The weight ratio of the monomer unit of the formula (5) to the one of the formula (6) preferably ranges from 95:5 to 40:60, still preferably from 90:10 to 60:40. Examples of monomer units which may be contained in the polymer other than those represented by the formulae (5) and (6) include acrylic acids (for example, acrylic acid and methacrylic acid); amido group-containing monomers (for example, acrylamide, methacrylamide, N-methylolacrylamide, and N-methylolmethacrylamide), epoxy group-containing monomers (for example, glycidyl acrylate, and glycidyl methacrylate), and amino group-containing monomers (for example, diethylaminoethyl acrylate, diethylaminoethyl methacrylate, and aminoethyl vinyl ether); and other monomer units derived from acrylonitrile, styrene, α-methylstyrene, alkyl vinyl ether, vinyl chloride, vinyl acetate, vinyl propionate and ethylene.

It is preferable that the copolymer has a number-average molecular weight of from 500 to 100,000 from the viewpoint of convenience in handling.

The copolymer has reactive silicon group represented by the following general formula (7):

(7)

wherein $R^8$ and $R^9$ represent each an optionally substituted monovalent organic group having 1 to 20 carbon atoms or a triorganosiloxy group; X's represent hydroxyl groups or hydrolyzable groups which may be either the same or different; c is an integer of 0, 1 or 2; d is an integer of 0, 1, 2 or 3, provided that (the sum of c's)+D is not less than 1; and q is an integer of from 0 to 19. From an economical viewpoint, reactive silicon groups represented by the following general formula (8) are preferable:

(8)

wherein $R^9$, X and d are each as defined above.

To achieve sufficient curability, it is preferable that the copolymer has at least 1, preferably at least 1.1 and still preferably at least 1.5, reactive silicon groups on average per molecule.

Particular examples of the hydrolyzable groups in the formula (7) include halogen atoms, hydrogen atom, alkoxy groups, acyloxy groups, ketoxymate group, amino group, amido group, aminoxy group, mercapto group and alkenyloxy groups. Among these groups, alkoxy groups such as methoxy group and ethoxy group are preferable because of the mild hydrolyzability thereof.

Particular examples of $R^8$ and $R^9$ in the formula (7) include alkyl groups such as methyl group and ethyl group, cycloalkyl groups such as cyclohexyl group, aryl groups such as phenyl group and aralkyl groups such as benzyl group. The groups $R^8$ and $R^9$ may be each a triorganosiloxy group represented by $R^4{}_3SiO—$ (wherein $R^4$ is as defined above). Among all, methyl group is particularly preferable therefor.

As another example of the process for producing an organic polymer by blending vinyl polymers having reactive silicon group, use may be made of a method wherein a (meth)acrylate monomer is polymerized in the presence of an organic polymer having reactive silicon group. Although this method is disclosed in detail, for example, in JP-A-59-78223, JP-A-59-168014, JP-A-60-228516 and JP-A-60-228517, the invention is not restricted thereto.

The compound (b) having reactive silicon group in its molecule to be used in the invention is a compound having at least one reactive silicon group in its molecule and being different from the component (a). When the same compound as the component (a) is used as the compound (b) having reactive silicon group in its molecule, it is needless to say that no special effect can be established by the addition thereof.

It is further preferable that the compound (b) having reactive silicon group in its molecule to be used in the invention has other reactive group(s) in its molecule so that it might undergo some interactions with other components of the one-pack type curable resin composition and the surface of an substrate. It is also preferable that the compound (b) has a relatively low molecular weight of 1,000 or less so that it might exert some favorable effects on the adhesion (for example, cohesion) at the adhesion interface. As such a compound, use can be made of those which are commonly employed as silane coupling agents.

Particular examples of the silane coupling agents include amino group-containing silane compounds; epoxy group-containing silane compounds such as γ-glycidoxypropyltrimethoxysilane, γ-glycidoxypropyltriethoxysilane, γ-glycidoxyprolpylmethyldimethoxysilane, and β-(3,4-epxoycyclohexyl)ethyltrimethoxysilane; mercapto group-containing silanes such as γ-mercaptopropyltrimethoxysilane, and γ-mercaptopropyldimethoxysilane; vinyl-type unsaturated group-containing silanes such as vinyltriethoxysilane, vinyltrimethoxysilane, γ-methacryloyloxypropyltrimethoxysilane, and γ-acryloyloxypropylmethyldimethoxysilane; chlorine atom-containing silanes such as γ-chloropropyltrimethoxysilane; isocyanate group-containing silanes such as γ-misocyanatopropyltriethoxysilane, and γ-isocyanatopropylmethyldimethoxysilane; and hydrosilanes such as methyldimethoxysilane, trimethoxysilane, and methyldiethoxysilane, though the invention is not restricted thereto.

Among these compounds, an amino group-containing silane compound (e) is preferable from the viewpoint of imparting adhesiveness.

The amino group-containing silane compound (e) may be an arbitrary one so long as it carries amino group and reactive silicon group in its molecule. Particular examples thereof include γ-aminopropyltrimethoxysilane, γ-aminopropyltriethoxysilane, γ-aminopropylmethyldimethoxysilane, N-(β-aminoethyl)-γ-aminopropyltrimethoxysilane, N-(β-aminoethyl)-γ-aminopropyltriethoxysilane, N-(β-aminoethyl)-γ-aminopropyldimethoxysilane, and 1,3-diaminoisopropyltrimethoxysilane. However, the invention is not restricted thereto and use can be made therefor of amino group-containing silane compounds commonly employed in the art. Either one of these amino group-containing silane compounds or a mixture of two or more thereof may be used.

Among the amino group-containing silane compounds as cited above, it is particularly preferable from the viewpoint of availability to use γ-aminopropylmethyldimethoxysilane, N-(β-aminoethyl)-γ-aminopropyltrimethoxysilane, or N-(β-aminoethyl)-γ-aminopropyldimethoxysilane. It is still preferable to use one having two or more amino groups, since high adhesive strength can be achieved thereby.

It is also preferable to use, as the compound (b) having reactive silicon group in its molecule, a reaction product obtained from two or more silane coupling agents. It is particularly preferable to use a product obtained by reacting an amino group-containing silane compound with an epoxy group-containing silane compound, or a product obtained by reacting an amino group-containing silane compound with an methacryloxy group-containing silane compound, as shown in JP-A-57-182350, since high adhesive strength can be achieved thereby.

It is also possible to use, as the compound (b) having reactive silicon group in its molecule, two or more silane coupling agents without performing any preliminary reaction. More particularly speaking, it is preferable to use, for example, a combination of an amino group-containing silane compound with an epoxy group-containing silane compound, a combination of an amino group-containing silane compound with an isocyanate-containing silane, or a combination of an epoxy group-containing silane compound with an isocyanate-containing silane, since high adhesive strength can be achieved thereby. It is also preferable to use a silane coupling agent seemingly capable of elevating the adhesive strength (for example, the amino group-containing silane compound (e)) together with vinyltrimethoxysilane as a dehydrating agent for improving the storage stability.

As the non-phthalate plasticizer (c) to be used in the invention, use may be made of a compound having no phthalate structure, which inactivates the stannous curing catalyst (d) in the coexistence of the compound (b) having reactive silicon group in its molecule, and being capable of controlling the viscosity and the mechanical characteristics of the one-pack type curable resin composition. Examples of such compounds include aliphatic dibasic acid esters such as dioctyl adipate, isodecyl succinate, and dibutyl sebacate; glycol esters such as diethylene glycol dibenzoate, and pentaerythritol ester; aliphatic esters such as butyl oleate and methyl acetylricinolate; phosphates such as tricresyl phosphate, trioctyl phosphate, and octyldiphenyl phosphate; epoxidized plasticizers such as epoxidized soybean oil, epoxidized linseed oil, and epoxidized benzyl stearate; ester plasticizers such as polyesters of dibasic acids with divalent alcohols; polyether plasticizers such as polypropylene glycol and its derivatives; polystyrenes such as poly-α-methylstyrene, and polystyrene; hydrocarbon plasticizers such as polybutadiene, polychloroprene, polyisoprene, polyisobutene, paraffin-type hydrocarbons, naphthene-type hydrocarbons, and paraffin/naphthene mixture-type hydrocarbons; and other plasticizers such as butadiene/acrylonitrile copolymer and chlorinated paraffins. Either one of these plasticizers or a mixture of two or more thereof may be employed. Among these plasticizers, it is preferable, from the viewpoint of hydrolysis resistance, to use polyether plasticizers such as polypropylene glycol and its derivatives; polystyrenes such as poly-α-methylstyrene, and polystyrene; hydrocarbon plasticizers such as polybutadiene, butadiene/acrylonitrile copolymer, polychloroprene, polyisoprene, polyisobutene, and paraffin; and non-ester plasticizers having no ester bond in the molecule such as chlorinated paraffins. From the viewpoint of weathering resistance, it is still preferable to use polyether plasticizers (for example, polypropylene glycol and its derivatives), polyisobutene and paraffin having no unsaturated bond in the main polymer chain. It is still preferable, from the viewpoint of coating staining properties, to use a polyoxyalkylene, wherein organic group has been introduced into more than 50% of the polyoxyalkylene polyol molecular chain ends, as a polyether plasticizer. Moreover, an allyl-ended polyoxypropylene, wherein allyl group has been introduced as an organic group into more than 80% of the molecular chain ends, is particularly preferable from the viewpoint of mortar water-proof adhesiveness.

It is also possible to use a compound having a relatively low molecular weight as the non-phthalate plasticizer (c), so long as the objects of the invention are not damaged thereby. Examples of such a compound include aromatic hydrocarbon solvents such as toluene, and xylene; ester solvents such as ethyl acetate, butyl acetate, amyl acetate and cellosolve acetate; and ketone solvents such as methyl ethyl ketone, and methyl isobutyl ketone.

As the stannous curing catalyst (d) to be used in the invention, use may be made of a stannous curing catalyst which can promote the reaction of the reactive group of the curable organic polymer (a) having reactive silicon group crosslinkable via the reaction in the one-pack type curable resin composition. Examples of such a curing catalyst include of stannous octylate, stannous stearate, stannous naphthenate and stannous versatate, though the invention is not restricted thereto. Either one of these curing catalysts or a mixture of two or more thereof may be used. It is also preferable from the viewpoint of curability to use an amine compound together with the curing catalyst. Examples of the amine compound include amine compounds such as butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo(5,4,0)undecene-7 (DBU), and carboxylic acid salts thereof; low-molecular weight polyamide resins obtained from polyamines in excess with polybasic acids; and products obtained by reacting polyamines in excess with epoxy compounds, though the invention is not restricted thereto. It is still preferable to use stannous dioctylate with laurylamine, since the curing speed can be easily controlled thereby. To achieve a sufficient curing speed, it is preferable to use 0.5 to 10 parts by weight, per 100 parts by weight of the curable organic polymer in the main agent, of stannous dioctylate and 0.1 to 10 parts by weight of laurylamine.

It is also possible to use curing catalysts other than the stannous curing catalyst (d), so long as the effects of the invention are not damaged thereby. Examples of such catalysts include titanates such as tetrabutyl titanate, tetrapropyl titanate, tetraisopropyl titanate, and titanium tetracetylacetonate; organotin compounds such as reaction products obtained from dibutyltin dilaurate, dibutyltin maleate, dibutyltin diacetate and dibutyltin oxide with phthalates, and dibutyltin diaetylacetonate; organoaluminum compounds such as aluminum trisacetylacetonate, aluminum trisethylacetoacetate, and diisopropoxyaluminum ethylacetonate; products obtained by reacting bismuth salts (for example, bismuth-tris(2-ethylhexoate), and bismuth-tris (neodecanoate)) with organic carboxylic acids or organic amines; chelate compounds such as zirconium tetraacetylacetonate, and titanium tetraacetylacetonate; organic lead compounds such as lead octylate; and organic vanadium compounds.

The one-pack type curable resin composition according to the invention may be one which contains, as the essential components, an organic polymer (a) having at least one reactive silicon group per molecule, a compound (b) having reactive silicon group in its molecule, a non-phthalate plasticizer (c) having no phthalate structure in its molecule, and a stannous curing catalyst (d). With respect to the mixing ration, it is preferable that the content of stannous curing catalyst ranges from 0.01 to 10 parts by weight, and the content of the compound (b) having reactive silicon group ranges from 0.01 to 100 parts by weight, each per 100 parts by weight of the organic polymer (a). By taking the effect of imparting adhesiveness into consideration, it is preferable that the content of the compound (b) having reactive silicon group is at least 0.1 part by weight. To achieve favorable adhesion even to substrates with poor adhesion properties (for example, mortar), it is still preferable to use the compound (b) in an amount of at least 1 part by weight. The content of the non-phthalate plasticizer (c) preferably ranges from 1 to 1,000 parts by weight. To obtain a cured matter having a favorable rubber elasticity, it is still preferable that the content of the non-phthalate plasticizer (c) is from 10 to 500 parts by weight. It is particularly preferable that the organic polymer (a) is one wherein the reactive silicon group is an alkoxysilyl group and the main chain skeleton is a polyoxyalkylene polymers, and the compound (b) is an amino-group containing silane compounds, the non-phthalate plasticizer (c) is a polyether plasticizer and/or a hydrocarbon plasticizer, and the stannous curing catalyst (d) is stannous octylate.

In addition to the components as described above, the one-pack type curable resin composition according to the invention may contain, if needed, various additives such as fillers, epoxy resins, epoxy curing agents, anti-sagging agents, colorants, reinforcing resins, storage stability improvers, anti-aging agents, ultraviolet absorbers, anti-ozone degradation agents, photostabilizers, amine-based radical chain terminators, phosphorus-based peroxide decomposers, lubricating agents, pigments and foaming agents.

As the above-mentioned fillers, use can be made of, for example, reinforcing fillers such as fumed silica, precipitated silica, silicic anhydride, aqueous silicic acid and carbon black; and fillers such as calcium carbonate, magnesium carbonate, diatomaceous earth, calcined clay, clay, talc, kaolin, titanium oxide, bentonite, organic bentonite, ferric oxide, zinc oxide, active zinc white, glass balloon, Shirasu balloon, organic balloon, organic fibers, and inorganic fibers.

To obtain a composition having a high viscosity by using these fillers, a favorable result can be achieved by using a filler selected mainly from among fumed silica, precipitated silica, silicic anhydride, aqueous silicic acid, carbon black, surface-treated fine calcium carbonate, calcined clay, clay and active zinc white in an amount of from 1 to 300 parts by weight per 100 parts by weight of the non-phthalate plasticizer (c). To obtain a composition having a low viscosity, a favorable result can be achieved by using a filler selected mainly from among titanium oxide, calcium carbonate, magnesium carbonate, talc, ferric oxide, zinc oxide and Shirasu balloon in an amount of from 5 to 500 parts by weight per 100 parts weight of the non-phthalate plasticizer. Either one of these fillers or a mixture of two or more thereof may be used.

Examples of the epoxy resins include fire retardant epoxy resins such as epichlorohydrin/bisphenol A epoxy resin, epichlorohydrin/bisphenol F epoxy resin and glycidyl other of tetrabromobisphenol A, novolak epoxy resin, hydroge-nated bisphenol A epoxy resin, bisphenol A propylene oxide adduct glycidyl ether epoxy resin, glycidyl other p-oxybenzoate epoxy resin, m-aminophenol epoxy resin, diaminodiphenylmethane epoxy resin, urethane-modified epoxy resin, various alicyclic epoxy resins, N,N-glycidylaniline, N,N-diglycidyl-o-toluidine, triglycidyl isocyanurate, polyhydric alcohol glycidyl ethers such as polyalkylene glycol diglycidyl ether and glycerol, and epoxidized unsaturated polymers such as hydantoin epoxy resin and petroleum epoxy resin. However, the invention is not restricted thereto and epoxy resins commonly employed in the art are usable therefor. Either one of these epoxy resins or a mixture of two or more thereof may be used.

Among the epoxy resins as cited above, it is preferable to use those having at least two epoxy groups per molecule, since such a material has a high reactivity in curing and the resultant cured product can easily form a three-dimensional network. It is still preferable to use, for example, bisphenol A epoxy resins or novolak epoxy resin.

As the epoxy curing agents, use may be made of amino compounds and ketimine compounds. Particular examples of the amino compounds include butylamine, octylamine, dibutylamine, monoethanolamine, diethanolamine, triethanolamine, diethylenetriamine, triethylenetetramine, oleylamine, cyclohexylamine, benzylamine, diethylaminopropyline, xlylenedamine, triethylenediamine, guanidine, diphenylguanidine, 2,4,6-tris(dimethylaminomethyl)phenol, morpholine, N-methylmorpholine, 2-ethyl-4-methylimidazole, and 1,8-diazabicyclo(5,4,0))undecene-7 (DBU). However, the invention is not restricted thereto and amino compounds commonly employed in the art are usable therefor. Either one of these amine compounds or a mixture of two or more thereof may be used.

Examples of the ketimine compounds include compounds represented by the following general formula (9):

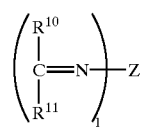

(9)

wherein $R^{10}$ and $R^{11}$ represent independently a hydrogen atom, an alkyl group having 1 to 6 carbon atoms or a phenyl group; Z represents an organic group; and 1 is 1, 2 or 3; which can be obtained by a condensation reaction between an amine compound with a carbonyl compound.

To synthesize the ketimine compounds, use may be made of ordinary amine compounds and carbonyl compounds. As the amine compounds, use can be made of, for example, diamines such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine, and p,p'-biphenylenediamine; polyvalent amines such as 1,2,3-triaminopropane, triaminobenzene, tris(2-aminoethyl)amine, and tetra(aminomethyl)methane; polyalkylenepolyamines such as diethylenetriamine, triethylenetriamine, and tetraethylenepentamine; polyoxyalkylene polyamines; and amino group-containing silane compounds such as γ-aminopropyltriethoxysilane, N-(β-aminoethyl)-γ-aminopropyltrimethoxysilane, and N-(β-aminoethyl)-γ-aminopropylmethyldimethoxysilane. As the carbonyl compounds, use can be made of, for example, aldehydes such as acetaldehyde, propionaldehyde, n-butylaldehyde, isobutylaldehyde, diethylacetaldehyde, glyoxal, and benzaldehyde; cyclic ketones such as cyclopentanone, trimethylcyclopentanone, cyclohexanone, and trimethylcyclohexanone; aliphatic ketones such as acetone, methyl ethyl ketone, methyl propyl ketone, methyl isopropyl ketone, methyl isobutyl ketone, diethyl ketone, dipropyl ketone, diisopropyl ketone, dibutyl ketone, and diisobutyl ketone; and β-dicarbonyl compounds such as methyl acetylacetone acetoacetate, ethyl acetoacetate, dimethyl malonate, diethyl malonate, methyl ethyl malonate and dibenzoylmethane.

In case of a ketimine having an imino group, the imino group may be reacted with, for example, styrene oxide; glycidyl ethers such as butyl glycidyl ether, and allyl glycidyl ether; and glycidyl esters. Either one of these ketimine compounds or a mixture of two or more thereof may be used.

Examples of the anti-sagging agents include hydrogenated castor oil derivatives; polyamide wax; and metal soaps such as calcium stearate, aluminum stearate and barium stearate. These anti-sagging agents may be optionally mixed with each other, depending on the purpose of the use or in case of being needed due to the addition of fillers and reinforcing matters.

As the colorants, use may be made of inorganic pigments, organic pigments and dyes commonly employed in the art, if needed.

The one-pack type curable resin composition according to the invention may be produced by, for example, the following process. The organic polymer (a) having at least one reactive silicon group per molecule, the compound (b) having reactive silicon group in its molecule, the nonphthalate plasticizer (c), the stannous curing catalyst (d) and other additives are mixed together with the use of a mixer, a roll, or a kneader. Then the obtained mixture is completely dehydrated by, for example, heating under reduced pressure to lower the moisture content to a level substantially causing no problem. The thus obtained one-pack type curable resin composition is stored in a moisture-proof sealed container.

The one-pack type curable resin composition according to the invention thus obtained would not cure during the storage period. When it is taken out from the container and exposed to the moisture in the atmosphere, it rapidly cures from the surface. Owing to these characteristics, the curable resin composition of the invention is useful as elastic sealings in buildings, construction works and industrial uses. It is also usable as paints, adhesives, sealants and coatings.

The present invention will now illustrated in greater detail with reference to the Examples in view of the Comparative Examples, but the present invention should not be construed as being limited thereto.

EXAMPLE 1

100 parts by weight of polyoxypropylene (molecular weight: 18,000, Mw/Mn=1.5) having reactive silicon group in its molecule, which had been synthesized by the method described in Synthesis Example 1 of International Publication 91/13928, 120 parts of surface-treated precipitated calcium carbonate (average particle diameter: 0.07 μm, Ultra Pflex® manufactured by Pfizer), 50 parts by weight of polypropylene glycol having an average molecular weight of 3,000, 20 parts by weight of titanium oxide, 3 parts by weight of hydrogenated castor oil, 1 part by weight of styrenated phenol employed as an anti-aging agent, 2 parts by weight of vinyltrimethoxysilane (A-171® manufactured by Nippon Unicar) employed as a dehydrating agent, 3 parts by weight of N-(β-aminoethyl)-γ-aminopropyltrimethoxysilane (A-1120® manufactured by Nippon Unicar) employed as an adhesiveness-imparting agent, 3 parts by weight of stannous octylate employed as a curing catalyst, and 0.5 parts by weight of laurylamine were kneaded together in a substantially moisture-free state and then stored in a moisture-proof sealed container to give a one-pack type curable resin composition.

EXAMPLE 2

A one-pack type curable resin composition was obtained as in Example 1 but using 100 parts by weight of polyoxypropylene having reactive silicon group in its molecule, which had been synthesized by the method described in Production Example of JP-A-2-145674, as the polyoxypropylene having reactive silicon group in its molecule and 50 parts by weight of a hydrocarbon compound (Exxsol D-130 manufactured by Exon Chemical) as a substitute for the polypropylene glcyol having an average molecular weight of 3,000.

EXAMPLE 3

A one-pack type curable resin composition was obtained as in Example 1 but further adding 2 parts by weight of γ-glycidoxypropyltrimethoxysilane (A-187® manufactured by Nippon Unicar) as an adhesiveness-imparting agent.

EXAMPLE 4

A one-pack type curable resin composition was obtained as in Example 3 but using 50 parts by weight of allyl ether-ended polyoxypropylene having an average molecular weight of 10,000, wherein allyl ether group had been introduced into 97% of the ends thereof, as a substitute for the polypropylene glcyol having an average molecular weight of 3,000.

Comparative Example 1

A one-pack type curable resin composition was obtained as in Example 1 but using 50 parts by weight of a phthalate, i.e., DIDP (diisodecyl phthalate) as a substitute for the polypropylene glycol having an average molecular weight of 3,000.

Comparative Example 2

A one-pack type curable resin composition was obtained as in Example 1 but adding no N-(β-aminoethyl)-γ-aminopropyltrimethoxysilane (A-1120®) as an adhesiveness-imparting agent.

Comparative Example 3

A one-pack type curable resin composition was obtained as in Example 1 but using 1 part by weight of dibutyltin laurate as a substitute for the stannous octylate curing catalyst.

By using the compositions of Examples 1 to 4 and Comparative Examples 1 and 2 thus obtained, samples were prepared in accordance with the method as specified in ASTM C794 and evaluated in adhesiveness. To evaluate under more strict conditions, adhesion samples were formed without applying any primer to the adhesion interface. The compositions of Examples 1 to 4 and Comparative Examples 1 and 2 were stored at 50° C. under a humidity of 55% for 4 weeks. Before and after the storage, each composition was poured into the lid of an ointment can and the curing speed was evaluated at 23° C. under a humidity of 55%. The time required until a thin film formed on the surface of the composition became noticeable by touching slightly was regarded as the curing time. As a result, the compositions of Comparative Example 1 showed a remarkably retarded curing, while the compositions of Examples 1 to 4 showed no retarded curing, thus exhibiting very good storage stability, as shown in Table 1. The cured product of Comparative Example 2 showed poor adhesiveness to various base materials, while the cured products of Examples 1 to 4 showed each favorable adhesiveness to various base materials.

TABLE 1

|  |  | Example | | | | Comp. Example | |
|---|---|---|---|---|---|---|---|
|  |  | 1 | 2 | 3 | 4 | 1 | 2 |
| Curing properties (50° C., 4 weeks) | Before storage | 6 hrs | 5 hrs | 6 hrs | 6 hrs | 5 hrs | 6 hrs |
|  | After storage | 6 hrs | 5 hrs | 6 hrs | 6 hrs | 30 hrs | 6 hrs |
| Substrate A | Adhesion strength (N/25.4 mm) | 54 | 62 | 76 | 76 | 65 | 15 |
|  | Adhesion | ⊚ | ⊚ | ⊚ | ⊚ | ⊚ | x |
| Substrate B | Adhesion strength (N/25.4 mm) | 56 | 59 | 73 | 73 | 63 | 15 |
|  | Adhesion | ○ | ○ | ⊚ | ⊚ | ○ | x |
| Substrate C | Adhesion strength (N/25.4 mm) | 33 | 35 | 65 | 65 | 35 | 12 |
|  | Adhesion | ○ | ○ | ○ | ⊚ | ○ | x |

Substrate A: glass.
Substrate B: aluminum alloy (anodic oxidation).
Substrate C: mortar.
Adhesion strength (N/25.4 mm): measured as in ASTM C794.
Adhesion:
⊚: cohesive failure 90 to 100%.
○: cohesive failure 20 to 90%.
x: cohesive failure 0 to 20%.

The compositions of Examples 1 to 4 and Comparative Example 3 were each poured into a frame and cured at 23° C. under a humidity of 55% for 14 days and then at 30° C. under a humidity of 55% for additional 14 days. Next, a dumbbell (JIS K 6301 No. 3) was produced and bench marks were formed thereon at intervals of 2 cm. After setting at 23° C. at 100% elongation for 24 hours, the setting was relieved and the restoring ratio (bench mark intervals after setting/bench mark intervals before setting×100) was measured. As a result, the cured products of Examples 1 to 4 showed each very excellent restoring properties, as shown in Table 2.

TABLE 2

|  | Example | | | | Comparative Example |
|---|---|---|---|---|---|
| Setting conditions | 1 | 2 | 3 | 4 | 3 |
| 23° C., 100% elongation for 24 hrs/ 1 hr after relieving | 94% | 95% | 94% | 95% | 55% |

A one-pack type curable resin composition having high adhesive strength to various substrates, good storage stability and excellent restoring properties can be obtained by using, as the essential components, an organic polymer having at least one reactive silicon group per molecule, a compound having reactive silicon group in its molecule, a non-phthalate plasticizer having no phthalate structure in its molecule and a stannous curing catalyst.

While the invention has been described in detail and with reference to specific examples thereof, it will be apparent to one skilled in the art that various changes and modifications can be made therein without departing from the spirit and scope thereof.

What is claimed is:

1. A one-pack type curable resin composition which contains an organic polymer (a) having at least one reactive silicon group per molecule, a silane coupling agent (b) having reactive silicon group in its molecule, a non-phthalate plasticizer (c) having no phthalate structure in its molecule, and a stannous curing catalyst (d).

2. The one-pack type curable resin composition as claimed in claim 1, wherein the reactive silicon group in said organic polymer (a) having at least one reactive silicon group per molecule is an alkoxysilyl group.

3. The one-pack type curable resin composition as claimed in claim 1, wherein said silane coupling agent (b) having reactive silicon group in its molecule is an amino group-containing silane compound (e).

4. The one-pack type curable resin composition as claimed in claim 1, wherein said non-phthalate plasticizer (c) is at least one selected from the group consisting of an aliphatic dibasic acid ester, a glycol ester, an aliphatic ester, a phosphate, an epoxidized plasticizer, an ester plasticizer, a polyether plasticizer, a polystyrene, a hydrocarbon plasticizer, and a chlorinated paraffin.

5. The one-pack type curable resin composition as claimed in claim 4, wherein said non-phthalate plasticizer (c) is a polyether plasticizer and/or a hydrocarbon plasticizer.

6. The one-pack type curable resin composition as claimed in claim 1, wherein said stannous curing catalyst (d) is at least one member selected from the group consisting of stannous octylate, stannous stearate, stannous naphthenate and stannous versatate.

* * * * *